(12) United States Patent
Beals et al.

(10) Patent No.: US 10,484,753 B2
(45) Date of Patent: Nov. 19, 2019

(54) SECURELY PAIRED DELIVERY OF ACTIVATION CODES FROM SMART CARD TO REMOTE CLIENT SET-TOP BOX

(71) Applicant: DISH Technologies L.L.C., Englewood, CO (US)

(72) Inventors: William Michael Beals, Englewood, CO (US); John Hamrick, Englewood, CO (US)

(73) Assignee: DISH Tchnologies L.L.C., Englewood, CO (US)

( * ) Notice: Subject to any disclaimer, the term of this patent is extended or adjusted under 35 U.S.C. 154(b) by 115 days.

(21) Appl. No.: 15/474,907

(22) Filed: Mar. 30, 2017

(65) Prior Publication Data

US 2018/0184177 A1    Jun. 28, 2018

Related U.S. Application Data

(60) Provisional application No. 62/438,908, filed on Dec. 23, 2016.

(51) Int. Cl.
    *H04L 29/06*        (2006.01)
    *H04N 21/6543*    (2011.01)
    (Continued)

(52) U.S. Cl.
    CPC ......... *H04N 21/6543* (2013.01); *G06F 21/85* (2013.01); *H04L 9/0897* (2013.01);
    (Continued)

(58) Field of Classification Search
    CPC .............................. G06F 21/85; H04L 63/123
    (Continued)

(56) References Cited

U.S. PATENT DOCUMENTS 5,768,539 A    6/1998   Metz et al.
6,219,787 B1   4/2001   Brewer
(Continued)

FOREIGN PATENT DOCUMENTS

EP      1 688 834 A2     8/2006
EP      2 299 692 A1     3/2011
WO    2007/146763 A2   12/2007

OTHER PUBLICATIONS

CI Plus Specification v1.3. Content Security Extensions to the Common Interface., Jan. 14, 2011, XP055030907, Retrieved from the Internet: URL:http://www.ci-plus.com/data/ci-plus_specification_v1.3.pdf [retrieved on Jun. 25, 2012] p. 1-p. 25.

(Continued)

*Primary Examiner* — Jason K Gee
*Assistant Examiner* — Dereena T Cattungal

(57) ABSTRACT

Described herein are systems and methods for hardware enforcement of hardware functionality in a client television receiver. An activation message containing an activation code for a specific hardware component within the client television receiver can be transmitted from a television service provider system to a host television receiver having an associated smart card. The smart card can decrypt the activation message, identify the client television receiver as the destination of the activation message, security check the activation message, encrypt the activation message with a local key, and transmit the activation message to a security processor on the client television receiver. The security processor can decrypt the activation message, security check the activation message to ensure it is from the smart card and has not been tampered with, and enable the hardware component within the client television receiver based on the activation code within the activation message.

20 Claims, 6 Drawing Sheets

(51) Int. Cl.

| | | |
|---|---|---|
| *H04L 9/08* | (2006.01) | |
| *H04L 9/32* | (2006.01) | |
| *H04N 21/235* | (2011.01) | |
| *H04N 21/258* | (2011.01) | |
| *H04N 21/266* | (2011.01) | |
| *H04N 21/418* | (2011.01) | |
| *H04N 21/435* | (2011.01) | |
| *H04N 21/443* | (2011.01) | |
| *H04W 12/06* | (2009.01) | |
| *G06F 21/85* | (2013.01) | |
| *G06F 21/10* | (2013.01) | |

(52) U.S. Cl.
CPC .......... *H04L 9/3234* (2013.01); *H04L 9/3236* (2013.01); *H04L 9/3239* (2013.01); *H04L 9/3247* (2013.01); *H04L 63/0464* (2013.01); *H04L 63/062* (2013.01); *H04L 63/0853* (2013.01); *H04L 63/123* (2013.01); *H04N 21/2351* (2013.01); *H04N 21/25816* (2013.01); *H04N 21/26613* (2013.01); *H04N 21/4181* (2013.01); *H04N 21/4353* (2013.01); *H04N 21/443* (2013.01); *H04W 12/06* (2013.01); *G06F 21/10* (2013.01); *H04L 2209/80* (2013.01)

(58) Field of Classification Search
USPC .......................................................... 713/172
See application file for complete search history.

(56) References Cited

U.S. PATENT DOCUMENTS

| | | | |
|---|---|---|---|
| 6,651,250 | B1 | 11/2003 | Takai |
| 6,779,198 | B1 | 8/2004 | Moringaga et al. |
| 8,385,542 | B2 | 2/2013 | Beals |
| 8,613,081 | B2 | 12/2013 | Beals |
| 8,844,816 | B2 | 9/2014 | Beals |
| 9,043,902 | B2 | 5/2015 | Beals et al. |
| 10,171,870 | B2 | 1/2019 | Beals |
| 2002/0099948 | A1 | 7/2002 | Kocher et al. |
| 2003/0030581 | A1 | 2/2003 | Roy |
| 2003/0084440 | A1 | 5/2003 | Lownes |
| 2003/0108199 | A1 | 6/2003 | Pinder et al. |
| 2003/0126400 | A1 | 7/2003 | Debiez et al. |
| 2003/0219127 | A1 | 11/2003 | Russ et al. |
| 2005/0226170 | A1 | 10/2005 | Relan et al. |
| 2006/0107285 | A1 | 5/2006 | Medvinsky |
| 2006/0161969 | A1* | 7/2006 | Moreillon ........... H04L 63/0272 726/3 |
| 2006/0272022 | A1 | 11/2006 | Loukianov et al. |
| 2007/0005506 | A1 | 1/2007 | Candelore |
| 2007/0180464 | A1 | 8/2007 | Dellow et al. |
| 2007/0294178 | A1 | 12/2007 | Pinder et al. |
| 2008/0022299 | A1 | 1/2008 | Le Buhan |
| 2008/0282345 | A1 | 11/2008 | Beals |
| 2009/0019061 | A1* | 1/2009 | Scannell, Jr. ...... G06F 17/30905 |
| 2009/0049220 | A1 | 2/2009 | Conti |
| 2009/0157936 | A1 | 6/2009 | Goss |
| 2009/0168996 | A1 | 7/2009 | Candelore |
| 2009/0172806 | A1 | 7/2009 | Natu |
| 2010/0169368 | A1 | 7/2010 | Neill |
| 2011/0017825 | A1 | 1/2011 | Beals |
| 2011/0138164 | A1 | 6/2011 | Cha et al. |
| 2012/0120250 | A1 | 5/2012 | Shintani et al. |
| 2012/0321080 | A1* | 12/2012 | Candelore ........ H04N 21/42623 380/201 |
| 2012/0321280 | A1 | 12/2012 | Lin |
| 2013/0279694 | A1* | 10/2013 | Gremaud ........... H04N 21/4181 380/211 |
| 2014/0282685 | A1 | 9/2014 | Beals et al. |
| 2015/0040155 | A1 | 2/2015 | Gutta et al. |
| 2016/0050190 | A1* | 2/2016 | Mooij ................. H04L 12/2803 380/279 |
| 2018/0157865 | A1 | 6/2018 | Beals |
| 2018/0184158 | A1 | 6/2018 | Beals |
| 2018/0184159 | A1 | 6/2018 | Beals et al. |
| 2018/0184176 | A1 | 6/2018 | Beals et al. |

OTHER PUBLICATIONS

International Search Report and Written Opinion for PCT/US2017/068150 dated Feb. 22, 2018, all pages.
International Search Report and Written Opinion for PCT/US2017/062756 dated Feb. 28, 2018, all pages.
International Search Report and Written Opinion for PCT/US2017/068173 dated Mar. 9, 2018, all pages.
International Search Report and Written Opinion for PCT/US2017/068163 dated Mar. 26, 2018, all pages.
Silberschatz A. et al., "Operating System Concepts—Fourth Edition", Operating System Concepts, XX, XX, No. ed.4, Jan. 1, 1994, pp. 28-35, XP002328940, the whole document.
U.S. Appl. No. 15/394,537, filed Dec. 29, 2016 Non-Final Rejection dated Nov. 28, 2017, all pages.
U.S. Appl. No. 15/394,537, filed Dec. 29, 2016 Notice of Allowance dated Sep. 11, 2018, all pages.
International Search Report and Written Opinion for PCT/US2017/068167 dated Apr. 17, 2018, all pages.
U.S. Appl. No. 15/370,927, filed Dec. 6, 2016 Non-Final Rejection dated Jul. 2, 2018, all pages.
U.S. Appl. No. 15/474,903, filed Mar. 30, 2017 Non-Final Rejection dated Jan. 10, 2019, all pages.
U.S. Appl. No. 15/474,893, filed Mar. 30, 2017 Non-Final Rejection dated Oct. 29, 2018, all pages.
U.S. Appl. No. 15/370,927, filed Dec. 6, 2016 Final Rejection dated Feb. 8, 2019, all pages.
U.S. Appl. No. 15/474,893, filed Mar. 30, 2017 Notice of Allowance dated Feb. 8, 2019, all pages.

\* cited by examiner

SECURELY PAIRED DELIVERY OF ACTIVATION CODES FROM SMART CARD TO REMOTE CLIENT SET-TOP BOX

CROSS-REFERENCES TO RELATED APPLICATIONS

This Application claims the benefit of and priority to U.S. Provisional Application No. 62/438,908, entitled STRONG CRYPTOGRAPHIC BETWEEN SMART CARD AND CLIENT SET-TOP BOXES, filed Dec. 23, 2016, which is incorporated herein by reference in its entirety for all purposes.

This Application is related to co-pending U.S. patent application Ser. No. 15/370,927, entitled SMART CARD AUTHENTICATED DOWNLOAD, filed Dec. 6, 2016. This Application is further related to co-pending U.S. patent application Ser. No. 15/474,903, entitled SECURELY PAIRED DELIVERY OF ACTIVATION CODES FROM SMART CARD TO HOST SET-TOP BOX, filed concurrently herewith, which claims priority to U.S. Provisional Application No. 62/438,902, filed Dec. 23, 2016. This Application is further related to co-pending U.S. patent application Ser. No. 15/474,893, entitled STRONG AUTHENTICATION OF CLIENT SET-TOP BOXES, filed concurrently herewith, which claims priority to U.S. Provisional Application No. 62/438,903, filed Dec. 23, 2016.

BACKGROUND OF THE INVENTION

Television service providers typically provide services to television service subscribers through a television receiver. The television subscribers can have a host (i.e., main) television receiver which houses a smart card that can authenticate the subscriptions the television subscriber has paid for/subscribed to and control access to content based on the television subscriber's subscriptions. Television subscribers may wish to have televisions in multiple rooms capable of displaying content subscribed to from the television subscriber. To accommodate this functionality, client television receivers (also sometimes referred to as thin clients) can be used. Client television receivers do not have a separate smart card. The host and client television receivers can include various hardware components that can provide the television service subscriber additional useful functionality associated with their television service. However, not all television service subscribers are willing to pay for additional functionality. Television service providers need a secure way to disable and enable the additional functionality for television service subscribers on client television receivers.

BRIEF SUMMARY OF THE INVENTION

Described herein are systems and methods for hardware enforcement of enabling hardware components in a client television receiver. The systems can include a client television receiver having a trusted hardware environment that includes a secure processor for executing instructions stored on a memory within the trusted hardware environment. The secure processor can control the enablement and disablement of hardware components within the client television receiver. The systems can also include a smart card within a host television receiver. The smart card can also include a secure processor that can execute instructions stored on a memory within the smart card. The instructions stored on the smart card memory and the client television receiver trusted hardware memory can be used to perform the associated methods. The methods can include the smart card receiving an activation message that contains an activation code for enabling one or more hardware components of the client television receiver. The smart card can decrypt the activation message with a global or unique network key, identify the client television receiver as the destination for the activation message, encrypt the activation message with a local key unique to the client television receiver, and transmit the activation message encrypted with the local key to the secure processor of the client television receiver. The secure processor of the client television receiver can receive the activation message and decrypt the activation message with the local key. The secure processor of the client television receiver can then enable the hardware component based on the activation code.

Optionally, the smart card can receive a second activation message and decrypt the second activation message. The smart card can security check the second activation message. Optionally, the smart card can discard the second activation message without transmitting the second activation message to the client television receiver if the security check failed.

Optionally, the hardware component can be one of multiple hardware components on the client television receiver. Optionally, the client television receiver can receive and decrypt a second activation message. Optionally, the client television receiver can security check the second activation message. Optionally, the client television receiver can disable all of the hardware components if the security check of the second activation message failed.

Optionally, the hardware component can be a wireless network transceiver, a Bluetooth® transceiver, a digital video recorder, a hard drive, or a universal serial bus connector.

Optionally, the security check performed by the smart card can include performing an integrity check. The integrity check can include calculating a hash of the second activation message using a cryptographic hashing algorithm. The integrity check can also include determining whether the second activation message has been tampered with based on the hash. Optionally, the security check can include determining that the security check passed only if the smart card determined that the second activation message was not tampered with.

Optionally, the security check performed by the smart card can include a signature check. The signature check can include determining whether the second activation message was transmitted from a trusted source, for example the television service provider, based on a signature key. Optionally, the security check can include determining that the security check passed only if the smart card determined that the second activation message was transmitted from the trusted source.

Optionally, the security check performed by the client television receiver can include performing an integrity check. The integrity check can include calculating a hash of the second activation message using a cryptographic hashing algorithm. The integrity check can also include determining whether the second activation message has been tampered with based on the hash. Optionally, the security check can include determining that the security check passed only if the client television receiver determined that the second activation message was not tampered with.

Optionally, the security check performed by the client television receiver can include a signature check. The signature check can include determining whether the second activation message was transmitted from a trusted source, for example the smart card, based on a signature key. Optionally, the security check can include determining that the security check passed only if the client television receiver determined that the second activation message was transmitted from the trusted source.

Optionally, the client television receiver can include more than one hardware component each having a unique activation code. The method can further include disabling hardware components for which the activation code is not included in the activation message, and enabling hardware components for which the activation code is included in the activation message.

Optionally, the smart card can pair with the client television receiver by receiving an authorization message from the television service provider containing the local key unique to the client television receiver. The smart card can store the local key in a memory. Once the smart card has the local key of the client television receiver stored, the smart card and the client television receiver are paired. Optionally, there can be multiple client television receivers and the smart card can be configured to pair with only a limited number of client television receivers.

Optionally, the smart card can receive a second activation message containing a second activation code for enabling a second hardware component of the host television receiver. The smart card can decrypt the second activation message and identify the host television receiver as a destination of the second activation message. Optionally, the smart card can encrypt the second activation message with a second local key unique to the host television receiver and transmit the activation message encrypted with the second local key to the host television receiver.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Television service providers often provide television services through a television receiver. Television service providers can allow a television subscriber to have a host television receiver, which can (typically through the use of a smart card) control access to content and other data to which the television subscriber has subscribed. Television service providers can also allow subscribers to have client television receivers, which do not have a smart card, but can be used to allow television subscribers to have television services to multiple televisions without having multiple host television receivers. The client television receivers can include additional hardware functionality for use by the television subscriber. However, not all television service subscribers are willing to pay for the additional hardware functionality. For example, a client television receiver can include functionality to allow the television subscriber to utilize a hard drive in the client television receiver for example, for recording television programs on the client television receiver. However, not all television subscribers wish to pay for hard drive functionality on a client television receiver. In such cases, the hard drive can be disabled via a software command. However, software enforcement of such functionality is susceptible to software hacking such that signal thieves and functionality thieves on a host or client television receiver can re-enable the functionality without much difficulty.

In comparison to software enforcement of such features, hardware enforcement is an order of magnitude more difficult to bypass by the signal and functionality thieves. As described in more detail below, unique activation codes for each piece of hardware within a client television receiver can be secured with hardware enforcement to ensure that the hardware functionality within a client television receiver is only enabled for valid messages with the proper authorization.

Figure 1:
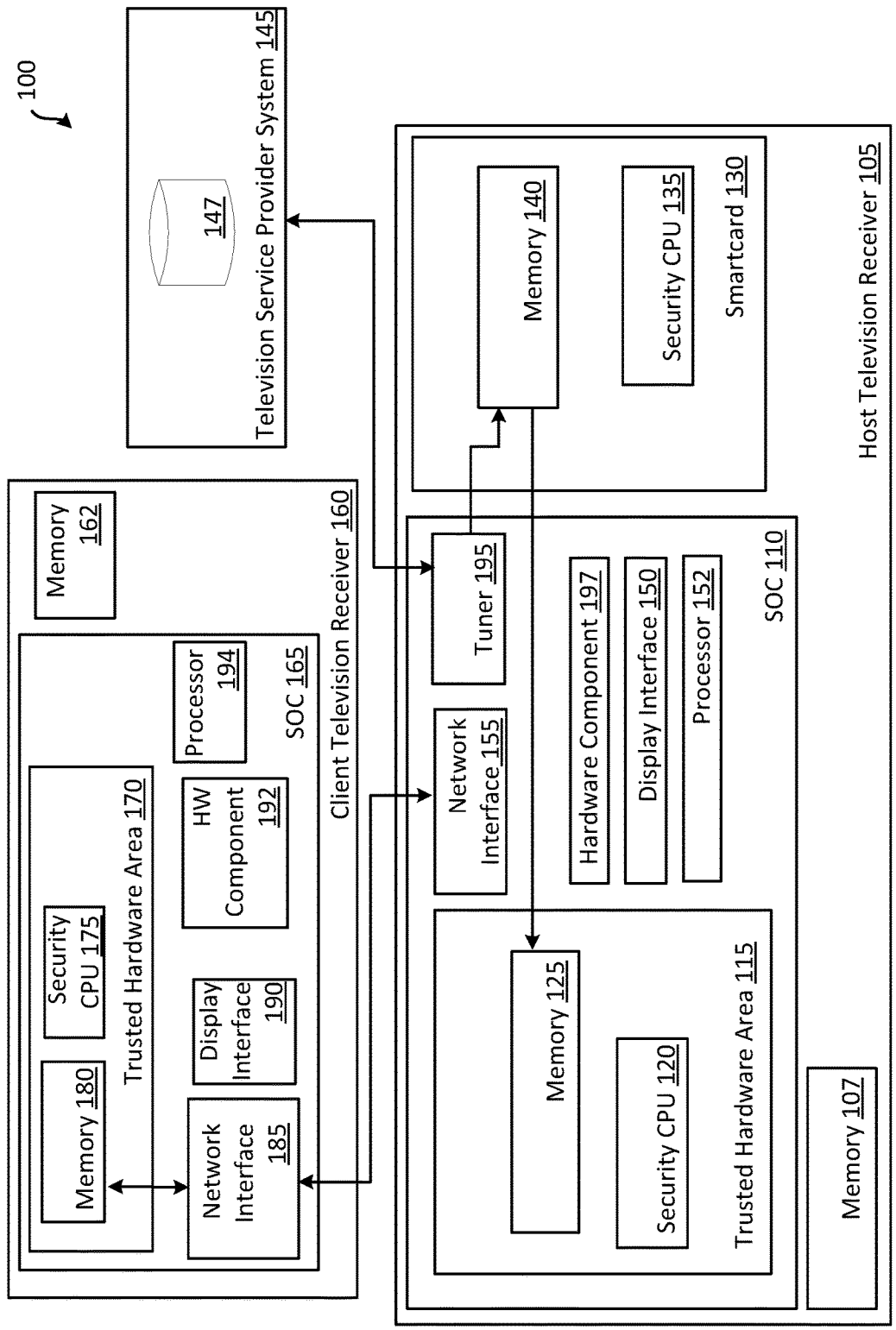
FIG. 1 illustrates a system for providing hardware enforcement of hardware components within a client television receiver.

FIG. 1 illustrates an embodiment of a television service system 100. The television service system 100 can include a television service provider system 145, a host television receiver 105, and a client television receiver 160.

Figure 4:
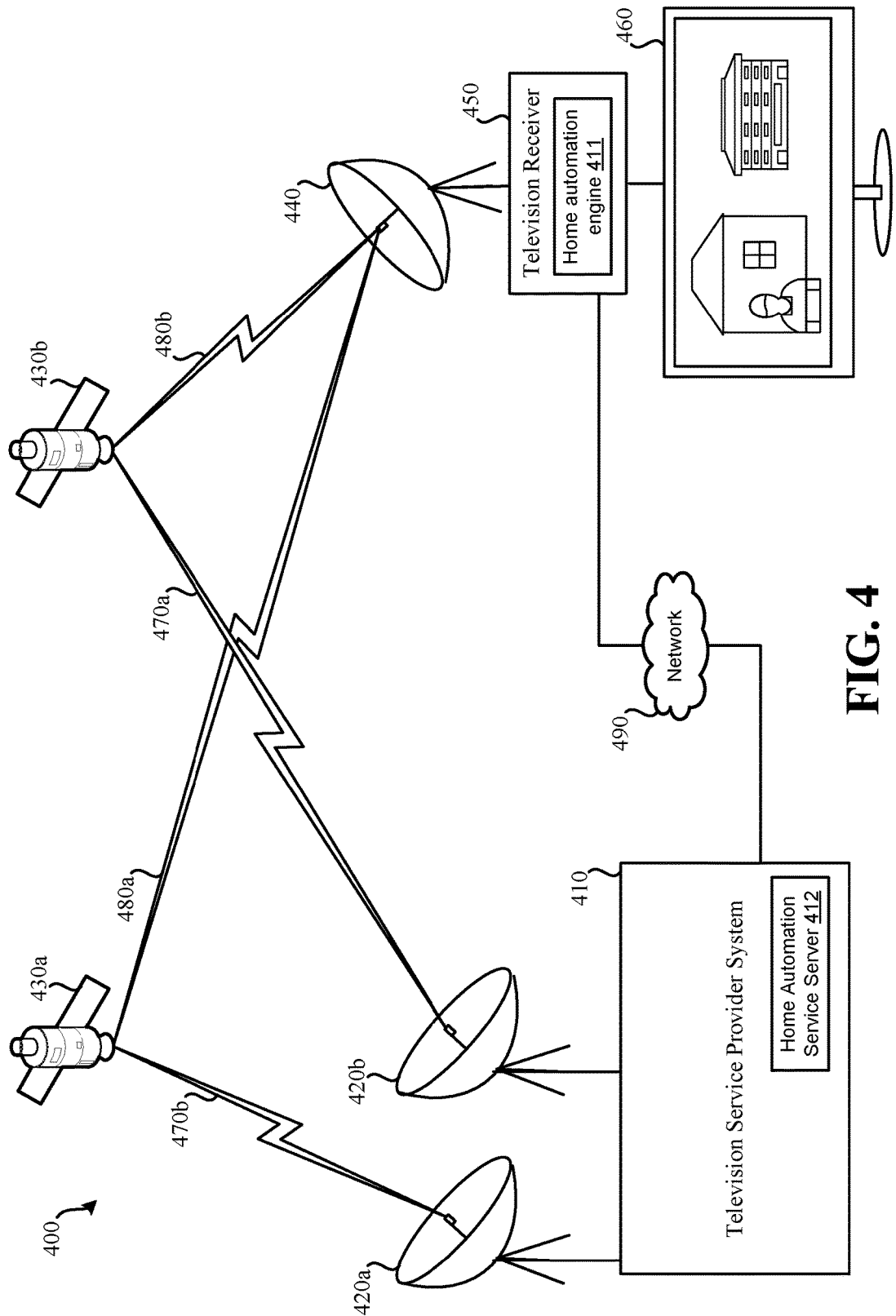
FIG. 4 illustrates an embodiment of a television service provider system.

Television service provider system 145 can be the source of the television service and can be, for example, television service provider system 410 described in FIG. 4. Television service provider system 145 can communicate with host television receiver 105, including transmitting content and other data including software images, authorization messages, activation messages, and the like. Television service provider system 145 can communicate with host television receiver 105 via any suitable network, including satellite as described in FIG. 4. The data transmitted from television service provider system 145 can be transmitted to host television receiver 105 and be processed through smart card 130 for decryption and authorizations as described in more detail herein. Data transmitted to host television receiver 105 can be encrypted with a global network key. The global network key can prevent signal thieves from stealing content and other data provided to host television receiver 105. The authorized receiving devices (e.g., smart card 130 within host television receiver 105) within television service system 100 can know the global network key. Television service provider system 145 can also communicate with client television receiver 160 via smart card 130 as described herein.

Television service provider system 145 can include activation code database 147. Activation code database 147 can include an activation code for each hardware component on each television receiver in television service system 100. The activation code for each hardware component can be unique. For example a Wi-Fi network transceiver on a first television receiver (e.g., host television receiver 105) can have a different activation code than the activation code of a Wi-Fi network transceiver on a different television receiver (e.g., client television receiver 160). Each activation code can be a code that authorizes the television receiver (e.g., host television receiver 105 or client television receiver 160) to enable the associated hardware component.

Host television receiver 105 may be configured to function as a host for a home automation system either alone or in conjunction with a communication device. Host television receiver 105 may be in the form of a separate device configured to be connected with a display device, such as a television. Embodiments of host television receiver 105 can include a set-top box ("STB"). In addition to being in the form of an STB, host television receiver 105 may be incorporated as part of another device, such as a television, other form of display device, video game console, computer, mobile phone or tablet, or the like. For example, a television may have an integrated television receiver, which does not involve an external STB being coupled with the television.

Host television receiver 105 can include a system on a chip ("SOC") 110, a memory 107, and a smart card 130. The smart card 130 can include a security central processing unit ("CPU") 135 (also referred to herein as security processor 135) and memory 140. The SOC 110 can include display interface 150, processor 152, network interface 155, tuner 195, hardware component 197, and trusted hardware area 115. Trusted hardware area 115 can include security CPU 120 (also referred to herein as security processor 120) and memory 125. Additionally, host television receiver 105 can include one or more of the following, which are not shown: a control processor, a tuning management processor, an electronic programming guide ("EPG") database, a digital video recorder ("DVR") database, an on-demand programming database, a home automation settings database, a home automation script database, a remote control interface, and/or a descrambling engine. In other embodiments of host television receiver 105, fewer or greater numbers of components may be present. It should be understood that the various components of host television receiver 105 may be implemented using hardware, firmware, software, and/or some combination thereof.

Host television receiver 105 can be, for example, television receiver 450 described in FIG. 4. Host television receiver 105 can include a receiving slot into which smart card 130 can be inserted. The receiving slot can include, for example, contact points (not shown) or any other suitable coupling mechanism. Smart card 130 can include contact points (not shown) that line up with the contact points within host television receiver 105 such that when smart card 130 is inserted into host television receiver 105, a communication link between smart card 130 and host television receiver 105 can be created. Any suitable coupling mechanism between smart card 130 and host television receiver 105 can be used, such as a male-to-female socket. Optionally, smart card 130 can be a removable or a non-removable device within host television receiver 105. Optionally, smart card 130 can be, for example, a ball grid array form factor, allowing the smart card 130 to be soldered on the main printed circuit board of the host television receiver 105. While only one host television receiver 105 is depicted in FIG. 1, any number (tens, hundreds, thousands) of host television receivers 105 can receive broadcasts from television service provider system 145 as part of the television service system 100.

Smart card 130 can be any suitable smart card. Smart card 130 can be provided to the television subscriber by, for example, a television service provider. Smart card 130 can be trusted because smart card 130 is designed to handle only security. As such, memory 140 and security CPU 135 are trusted hardware. Further, if security on smart card 130 is compromised, smart card 130 can be replaced without replacing the entire host television receiver 105. Memory 140 can include, for example, instructions that the security CPU 135 can execute to perform various functions specific to smart card 130. For example, memory 140 can include instructions to decrypt data sent from television service provider system 145 using a global network key, which can be stored within memory 140.

Memory 140 can also include instructions for encrypting data with a local key. The local keys used to encrypt activation messages before transmission to the host television receiver 105 and the client television receiver 160 can be hardware local keys. The hardware local key is a static (i.e., does not change) key that can be programmed at chip manufacturing for the SOC 110 or SOC 165. Optionally, the hardware local key can be programmed at STB manufacturing or some other suitable time. SOC 110 and SOC 165 can each have a distinct, unique hardware local key. The hardware local key is known only to the television service provider, the security CPU of the SOC (e.g., SOC 110 or SOC 165), and the smart card 130. Stated differently, the hardware local key for SOC 165 can be known only to trusted hardware including the television service provider trusted hardware, within trusted hardware area 170, and to smart card 130. Similarly, the hardware local key for SOC 110 can be known only within trusted hardware of the television service provider, trusted hardware area 115 and smart card 130. Because the local key for SOC 110 is known only to the television service provider, the security CPU 120, and the smart card 130, the security CPU 120 can know when it receives data encrypted with its local key that the data was sent from a trusted source. Similarly, because the local key for SOC 165 is known only to the television service provider, the security CPU 175 and the smart card 130, the security CPU 175 can know when it receives data encrypted with its local key that the data was sent from a trusted source. Memory 140 can include instructions for encrypting data intended for a television receiver with that television receiver's local key and transmitting the encrypted data to the television receiver. Further, memory 140 can include a unique identifier for smart card 130, which can be used for authorization and pairing smart card 130 to host television receiver 105 and/or to client television receiver 160 as described in more detail below. Memory 140 can also include information that specifies the content allowed or intended for host television receiver 105 and/or for client television receiver 160. Memory 140 can be any size memory. Memory on a smart card, however, is typically limited due to physical size constraints. Security CPU 135 can be any suitable processor configured to execute only trusted instructions stored on memory 140.

Memory 107 can include instructions for execution by, for example, processor 152. Memory 107 can include the operating system of host television receiver 105, for example. Memory 107 can be, for example, working memory 535 of FIG. 5. Memory 107 can be, for example, a flash drive, random access memory ("RAM"), read only memory ("ROM"), or any other suitable memory device. Further, while depicted as having a single memory 107, host television receiver 105 can include more than one memory device.

SOC 110 can include tuner 195, display interface 150, processor 152, network interface 155, hardware component 197, and trusted hardware area 115. Trusted hardware area 115 can include memory 125 and security CPU 120. Security CPU 120 can be any suitable processor (i.e., CPU) configured to execute only trusted instructions stored on memory 125. Memory 125 can include, for example, instructions that security CPU 120 can execute to perform various functions specific to host television receiver 105. For example, memory 125 can include instructions to decrypt data sent from smart card 130. Memory 125 can also store all activation codes for hardware component 197 and for security CPU 120. Memory 125 can also store the hardware local key needed to decrypt data intended for host television receiver 105. As discussed above, the hardware local key can be programmed into memory 125 during manufacturing of SOC 110. Additionally, SOC 110 can have a unique identifier, which can be stored in memory 125. Memory 125 can be any size memory.

Display interface 150 can serve to output a signal to a television or another form of display device in a proper format for display of video and playback of audio. As such, display interface 150 can output one or more television channels, stored television programming (e.g., television programs from a DVR database or television programs from on-demand programming and/or information from an EPG database), to a television for presentation. SOC 110 can include network interface 155, which can be any suitable network interface for communicating on a network at least between host television receiver 105 and client television receiver 160. SOC 110 can further include other components not shown and described above to control home automation, DVR functionality, and the like.

Processor 152 can be any suitable processor used to process instructions stored in, for example, memory 107. Processor 152 can be one or more general-purpose processors and/or one or more special-purpose processors such as digital signal processing chips, graphics acceleration processors, and/or the like. Processor 152 can be, for example, processor 510 of FIG. 5. Optionally, while depicted as having a single processor 152, host television receiver 105 can include more than one processor.

Tuner 195 may include one or more tuners used to tune to transponders that include broadcasts of one or more television channels or transmission of other data, such as software images. Such tuners may be used also to receive for storage on-demand content and/or addressable television commercials. In some embodiments, two, three, or more than three tuners may be present, such as four, six, or eight tuners. Each tuner contained in tuner 195 may be capable of receiving and processing a single transponder stream from a satellite transponder or from a cable network at a given time. As such, a single tuner may tune to a single transponder stream at a given time. If tuner 195 includes multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuner 195 may be used to receive the signal containing the multiple television channels for presentation and/or recording. Tuner 195 may receive commands from a tuning management processor (not shown), which can instruct tuner 195 to which frequencies are to be tuned.

Host television receiver 105 can include hardware component 197. While only one hardware component 197 is depicted in FIG. 1, any number of hardware components 197 can be present in host television receiver 105. Hardware component 197 can be any type of hardware component for use in host television receiver 105. Example hardware components include a digital video recorder ("DVR"), a universal serial bus ("USB") connector, a hard drive, and external hard drive, a wireless network transceiver, a Bluetooth® transceiver, an external USB connector, a decryption component for decrypting local content, and the like. The activation codes for hardware component 197 can be stored in memory 125 in trusted hardware area 115. Additionally, security CPU 120 can have an activation code, which can also be stored in memory 125. By maintaining the activation codes in the trusted hardware area 115, they are not easily accessible to signal and functionality thieves.

Client television receiver 160 can include memory 162 and SOC 165. SOC 165 can include network interface 185, display interface 190, hardware component 192, processor 194, and trusted hardware area 170. Trusted hardware area 170 can include security CPU 175 (also referred to herein as security processor 175) and memory 180. Note that client television receiver 160 does not have a smart card. Client television receiver 160 can be any client television receiver with capability to receive and process content and data as described herein but which does not have a smart card physically coupled. Client television receiver can communicate with host television receiver 105 and smart card 130 through network interfaces 185 and 155. The network that the network interfaces 185 and 155 communicate through can be a trusted or untrusted network. The network interfaces 185 and 155 can be wired or wireless interfaces allowing communication via Bluetooth®, Wi-Fi, TCP/IP, or any other suitable communication protocol.

Client television receiver 160 may be in the form of a separate device configured to be connected with a display device, such as a television. Embodiments of client television receiver 160 can include set-top boxes ("STBs"). In addition to being in the form of an STB, client television receiver 160 may be incorporated as part of another device, such as a television, other form of display device, video game console, computer, mobile phone or tablet, or the like. For example, a television may have an integrated television receiver, which does not involve an external STB being coupled with the television.

Display interface 190 can serve to output a signal to a television or another form of display device in a proper format for display of video and playback of audio. As such, display interface 190 can output one or more television channels, stored television programming (e.g., television programs from a DVR database or television programs from on-demand programming and/or information from an EPG database), to a television for presentation.

Processor 194 can be any suitable processor used to process instructions stored in, for example, memory 162. Processor 194 can be one or more general-purpose processors and/or one or more special-purpose processors such as digital signal processing chips, graphics acceleration processors, and/or the like. Processor 194 can be, for example, processor 510 of FIG. 5. Optionally, while depicted as having one processor 194, client television receiver 160 can include more than one processor.

Trusted hardware area 170 can include security CPU 175 and memory 180. Security CPU 175 can be any suitable CPU configured to execute only trusted instructions stored on memory 180. Optionally, while depicted as a single security CPU 175, trusted hardware area 170 can include more than one security CPU. Memory 180 can include, for example, instructions that security CPU 175 can execute to perform various functions specific to client television receiver 160. For example, memory 180 can include instructions to decrypt data sent from smart card 130. Memory 180 can also store the hardware local key needed to decrypt data intended for client television receiver 160. As discussed above, the hardware local key can be programmed into memory 180 during manufacturing of SOC 165. Additionally, SOC 165 can have a unique identifier, which can be stored in memory 180. Memory 180 can be any size memory. Optionally, while depicted as having a single memory 180, trusted hardware area 170 can include more than one memory.

Memory 162 can include instructions for execution by, for example, processor 194. Memory 162 can include the operating system of client television receiver 160, for example. Memory 162 can be, for example, working memory 535 of FIG. 5. Optionally, while depicted as having a single memory 162, client television receiver 160 can include more than one memory.

Client television receiver 160 can include hardware component 192. While only one hardware component 192 is depicted in FIG. 1, any number of hardware components 192 can be present in client television receiver 160. Hardware component 192 can be any type of hardware component for use in client television receiver 160. Example hardware components include a digital video recorder ("DVR"), a universal serial bus ("USB") connector, a hard drive, an external hard drive, a wireless network transceiver, a Bluetooth® transceiver, an external USB connector, a decryption component for decrypting local content, and the like. The activation codes for hardware component 192 can be stored in memory 180 in trusted hardware area 170. Additionally, security CPU 175 can have an activation code, which can also be stored in memory 180. By maintaining the activation codes in the trusted hardware area 170, they are not easily accessible to signal and functionality thieves. Hardware component 192 can be enabled or disabled using hardware enforcement via security processor 175.

In use, data transmitted to host television receiver 105 from television service provider system 145 can be encrypted with a global or unique network key. This global or unique network key system can prevent signal thieves from stealing content and other data provided to host television receiver 105. For signature verification purposes, the smart card 130 within host television receiver 105 on the television service system 100 can know the global public signature key to verify signatures, but does not have the global private signature key, so not even a compromised smart card can sign data for other devices since it does not have the global private signature key. As described in more detail herein, a local key can be used by the authorized decrypting devices (e.g., smart card 130) to maintain a high level of security with the television receivers (e.g., host television receiver 105 and client television receiver 160), ensuring that the content and other data transmitted to television receivers remains secure and can only be decrypted by the specific television receiver (e.g., host television receiver 105 or client television receiver 160) to which it was transmitted. It is impractical, however, to encrypt each transmission separately for each television receiver and, therefore, a global network key is practical at the television service provider transmission level.

Prior to distributing content or other information to the host television receiver 105 or client television receiver 160, smart card 130 can pair (also called marrying) with client television receiver 160 and host television receiver 105. To pair, the unique identifier of the SOC (e.g., 110 or 165) and the unique identifier of the smart card 130 can be transmitted to the television service provider system with a request for authentication. This can be done, for example, on power up of the host television receiver 105 and/or client television receiver 160. If the television receiver (client television receiver 160 or host television receiver 105) is authorized for the television subscriber having smart card 130 (e.g., television subscriber has paid for/is authorized to have a client television receiver 160 or host television receiver 105) the television service provider system 145 can transmit an authentication message. The authentication message can include an authentication code and the local key for SOC 110 to smart card 130 if the request to pair was for the host television receiver 105. If the request to pair was for the client television receiver 160, the authentication message can include an authentication code and the local key for SOC 165 to smart card 130. Once smart card 130 has the SOC 110 local key, smart card 130 can encrypt data specifically for host television receiver 105 that cannot be decrypted by any other television receiver, including client television receiver 160. Similarly, once smart card 130 has the SOC 165 local key, smart card 130 can encrypt data specifically for client television receiver 160 that cannot be decrypted by any other television receiver, including host television receiver 105.

After initial pairing, an activation message can be sent by television service provider system 145. Television service provider system 145 can send an activation message to client television receiver 160 including activation codes for the hardware that is authorized for use by the television subscriber. Television service provider system 145 can also send an activation message to host television receiver 105 including activation codes for the hardware that is authorized for use by the television subscriber. Television service provider system 145 can obtain activation codes from activation code database 147 for host television receiver 105 and client television receiver 160 based on the subscription of the television subscriber. For example, if the television subscriber has paid for the use of hardware component 192 but no other hardware components (not shown), the television service provider system 145 can transmit an activation message that includes an activation code for hardware component 192 only to client television receiver 160. The activation message can also include an activation code for security CPU 175 itself. That is, security CPU 175 can be dormant after reset and will respond only to an activation code for itself. Only after security CPU 175 is activated by a valid activation code can security CPU 175 perform other security functions including activating hardware components based on activation codes in activation messages. Similarly, if the television subscriber has paid for the use of hardware component 197 but no other hardware components on host television receiver 105, the television service provider system 145 can transmit an activation message that includes an activation code for hardware component 197 only to host television receiver 105. The activation message can also include an activation code for security CPU 120 itself. That is, security CPU 120 can be dormant after reset and will respond only to an activation code for itself. Only after security CPU 120 is activated by a valid activation code can security CPU 120 perform other security functions including activating hardware components based on activation codes in activation messages.

The activation message can be transmitted by television service provider system 145 and received by tuner 195 in host television receiver 105. Before transmitting the activation message to smart card 130, host television receiver 105 can store the encrypted message locally in non-secure memory (not shown) to allow activations to occur after every reset without waiting for television service provider system 145 to send the activation message again. Smart card 130 can receive the activation message from host television receiver 105. Security processor 135 can also store the activation message in memory 140.

Security processor 135 can decrypt the activation message with a global or unique network key stored in memory 140. Optionally, security processor 135 can perform a security check on the activation message including a signature check to confirm that the activation message originated from television service provider system 145 and/or including an integrity check to confirm that the activation message has not been tampered with. Additionally, security processor 135 can inspect the data in the activation message to identify the television receiver (host television receiver 105 or client television receiver 160) that the activation message is intended for. For example, if the security check passes and the activation message is intended for client television receiver 160, the security processor 135 can encrypt the activation message with the local key for client television receiver 160 and transmit the encrypted activation message to security processor 175. The activation message can be transmitted through network interface 155 to network interface 185 into memory 180 for processing by security CPU 175. If, for example, the security check passes and the activation message is intended for host television receiver 105, the security processor 135 can encrypt the activation message with the local key for host television receiver 105 and transmit the encrypted activation message to security processor 120.

If the message was intended for client television receiver 160, security processor 175 can receive the activation message. Until security processor 175 receives the activation message, security processor 175 can be dormant. Upon receiving the activation message, security processor 175 can wake up to confirm activation of itself and any other features on client television receiver 160. After receiving the activation message, security processor 175 can store the activation message in memory 180. Security processor 175 can decrypt the activation message with the local key and perform a security check on the activation message. The security check can include a signature check to confirm that the activation message was transmitted from security processor 135. The security check can also include an integrity check to confirm that the activation message is not corrupt and has not been tampered with. If the security check passes, the security processor 175 can identify the activation codes within the activation message. Optionally, the activation message including the activation code for security processor 175 can be a separate message from the activation message that includes activation codes for other hardware functionality. Optionally, each activation code can be transmitted to client television receiver 160 in a separate activation message. If the proper activation code for activating security processor 175 is included or if security processor 175 was previously activated, security processor 175 can identify the other hardware functionality activation codes within the activation message and enable the appropriate hardware functionality based on the activation code. For example, if the activation code is associated with hardware component 192, the security processor 175 can enable hardware component 192. If the proper activation code for activating security processor 175 is not included and the security processor 175 was not previously activated, security processor 175 can return to a dormant state after optionally disabling all hardware functionality in client television receiver 160. This response can ensure that client television receiver 160 is non-functional without the proper activation. Also, because the activation codes are stored only in trusted hardware area 170, at the television service provider system 145, and on the trusted hardware of the smart card 130, the enforcement is very secure. Accessing or changing data stored in trusted hardware areas on smart card 130 and trusted hardware area 170 is very difficult, making it an order of magnitude more difficult to signal and functionality thieves to use the hardware functionality on client television receiver 160 without the proper activation. The same process can occur if the activation message was intended for host television receiver 105 with security processor 120 receiving and processing the activation message.

Note that while the activation message transmitted from security CPU 135 to security CPU 175 may go through areas of host television receiver 105 that are not as trusted as smart card 130 and trusted hardware area 170 as well as a network between network interface 155 and 185 that may not be trusted, the security of the activation message is ensured. Security CPU 175 is designed to recognize when messages have been tampered with. Therefore, the integrity of the activation message that security CPU 175 utilizes to enable hardware functionality within client television receiver 160 is ensured. Further, the activation message includes activation codes as described above. Security CPU 175 can compare the activation codes stored in memory 180 with the activation codes transmitted in the activation message to determine which hardware functionality to enable. Because security CPU 175 is within trusted hardware area 170, the enforcement of the security of the transmitted data is ensured by the trusted hardware. Because hardware enforcement of security is an order of magnitude more secure than software enforcement of security, the system is substantially less vulnerable to hacking than a system in which security were enforced with software and processors that are not in a trusted hardware portion of the client television receiver 160.

Figure 2A:
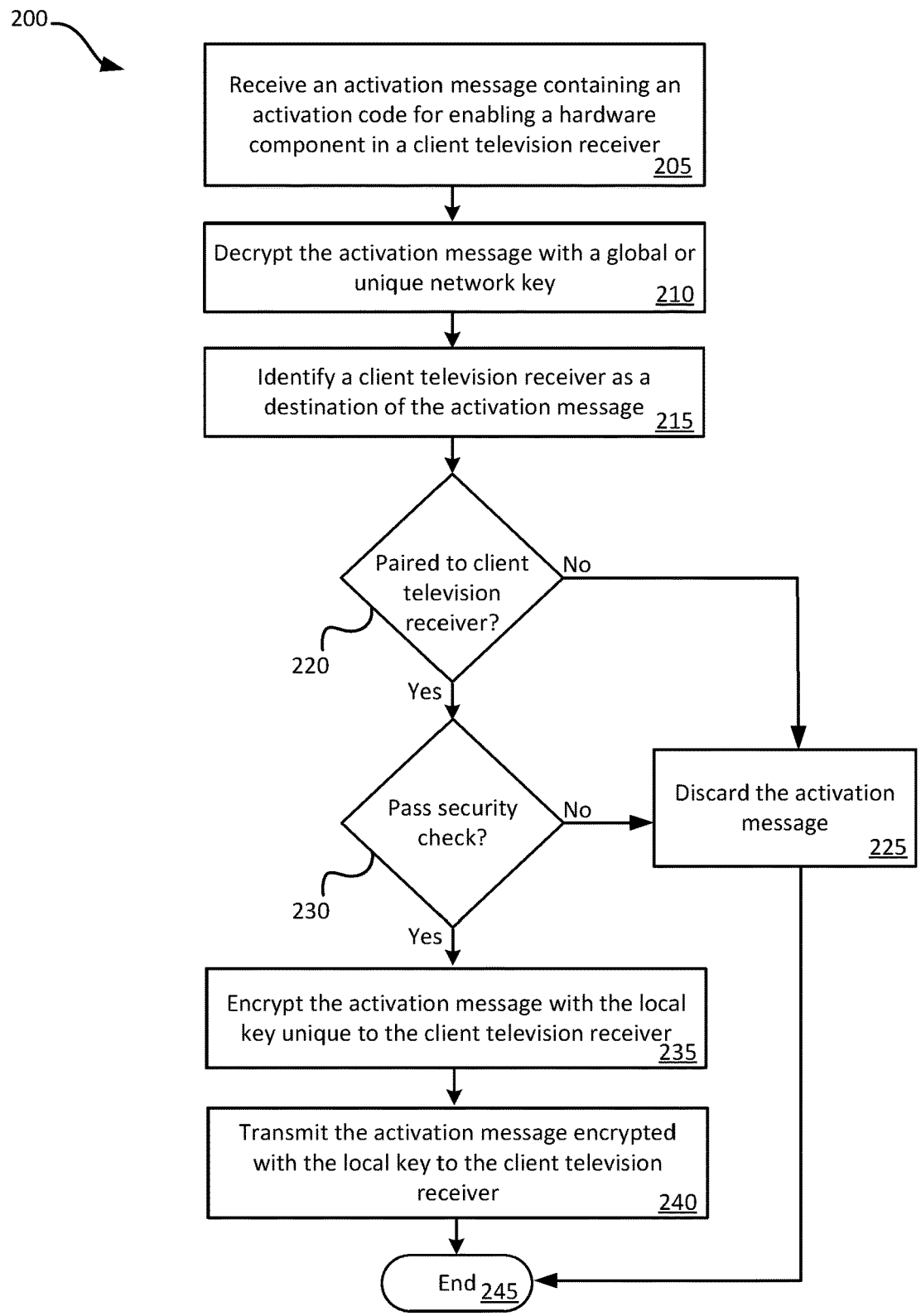
FIGS. 2A and 2B illustrate methods for providing hardware enforcement of hardware components within a client television receiver.

FIG. 2A illustrates a method 200 for providing secured hardware enforcement of hardware functionality on a client television receiver. Method 200 can be performed by, for example, smart card 130 of FIG. 1. Method 200 can begin at 205 with the smart card receiving an encrypted activation message containing an activation code for enabling a hardware component or hardware functionality of a client television receiver. The activation message can be encrypted with a global network key known to all authorized receiving devices (e.g., smart card 130) on the television service provider network. The smart card can be inserted into a host television receiver for providing security services on the host and client television receivers for a television service provider system. The smart card can receive data via the host television receiver from the television service provider system. The data can be sent from the television service provider system via a satellite, cable, or any other suitable network. The data can include activation messages, content, software images, and any other suitable data. The host and client television receivers can each include multiple hardware components, each hardware component having an associated activation code. The activation code for each hardware component can be unique. Further, the activation code for each hardware component can be unique throughout the entire system. Stated differently, each hardware component on each television receiver can have an associated activation code that is unique from every other hardware component on every other television receiver.

At 210, the smart card can decrypt the authorization message with the global network key or a unique key. Optionally, a unique key can be used that is known to one or more authorized receiving devices. Once decrypted, the smart card can, at 215, determine based on the activation message that the activation message destination is a client television receiver (e.g., client television receiver 160). For example, the activation message can include a unique identifier (e.g., a serial number) of the client television receiver. The smart card can know the unique identifier for the client television receiver and therefore know that the activation message is intended for the client television receiver. Note that the client television receiver does not contain a smart card. Further note that the smart card that receives the activation message is coupled to a host television receiver by, for example, inserting the smart card into a receiving slot, or as another example by having the smart card soldered to the main printed circuit board of the host television receiver.

At 220, the smart card can determine whether the destination client television receiver is paired to the smart card. For example, if the smart card does not have stored in memory the local key for the client television receiver, the smart card can know it is not paired with the client television receiver. Note that optionally, the smart card can be paired with more than one client television receiver. Optionally, if the client television receiver is not paired with the smart card, the smart card can initiate a pairing operation to attempt to pair the client television receiver with the smart card. Optionally, the smart card can discard the activation message at 225 without transmitting the activation message to the client television receiver if the client television receiver is not paired with the smart card. If the client television receiver is not paired with the smart card, method 200 can end at 245.

At 230, if the smart card is paired with the client television receiver, the smart card can optionally perform a security check. Optionally, the security check can include a signature check. The signature check can confirm that the activation message was received from a trusted source, such as the television service provider system. Only trusted sources have the private signature key needed to sign messages that can be signature checked with the public signature key. The smart card can confirm the source of the activation message is trusted if the signature check with the public signature key was successful. If the signature check passed, the smart card can optionally continue the security check with an integrity check discussed below. If the signature check failed, the smart card can discard the activation message at 225 and the method 200 can end at 245. Note that the order of the integrity check and the signature check can be inverted. Stated differently, the integrity check can be optionally performed before the signature check. Further note that the signature check and the integrity check can each be optional. Optionally, only a signature check is performed. Optionally, only an integrity check is performed. Optionally, some other form of security check can be performed. Optionally, no security check is performed. Further, the pairing check of 220 can be performed before or after the security check at 230.

The optional integrity check can include the smart card calculating a hash of the activation message using a cryptographic hashing algorithm. The cryptographic hashing algorithm can be any suitable hashing algorithm used for confirming that the activation message has not been corrupted or tampered with. The integrity check can include using the calculated hash to confirm that the activation message is not corrupted or tampered with. The integrity check can be, for example, a check of the hash against a known value, for example against a hash that is passed with the activation message to the smart card. For example, the first bits transmitted to the smart card from the television service provider can be a value against which the hash can be compared. As another example, the last bits transmitted to the smart card from the television service provider can be a value against which the hash can be compared. The bits transmitted for comparison can be the value of the hash calculated by the television service provider system and transmitted for the integrity check. The value can be calculated by the television service provider using the same cryptographic hashing algorithm. If the comparison passes, the integrity check can pass and the method can continue at 235. If the integrity check fails, the smart card can discard the activation message at 225 and the method 200 can end at 245.

At 235, if the security check passed, the smart card can encrypt the activation message with the local key specific (e.g., unique) to the client television receiver. The local key can be the hardware local key that is unique to the client television receiver. By encrypting the activation message with the local key unique to the client television receiver, the smart card ensures that the activation message can only be decrypted by the client television receiver, and not any other television receiver, including the host television receiver.

Optionally, the smart card can modify the activation message before encrypting the activation message with the local key at 230. For example, the smart card can reformat the activation message. As another example, the smart card can add information to the activation message. As yet another example, the smart card can remove information from the activation message.

At 240, the smart card can transmit the activation message encrypted with the local key to the security processor of the client television receiver. As discussed with respect to FIG. 1, the smart card can transmit the activation message over an untrusted network through a network interface in the host television receiver that houses the smart card. Optionally, the smart card can transmit the activation message using a network interface of the smart card. For example, the smart card can include a wireless network interface such as, for example, Bluetooth® or Wi-Fi. The smart card can use that wireless network interface to transmit the authorization message to the client television receiver. The client television receiver can include a network interface that can be used to receive the activation message. The method 200 can end at 245.

Figure 2B:
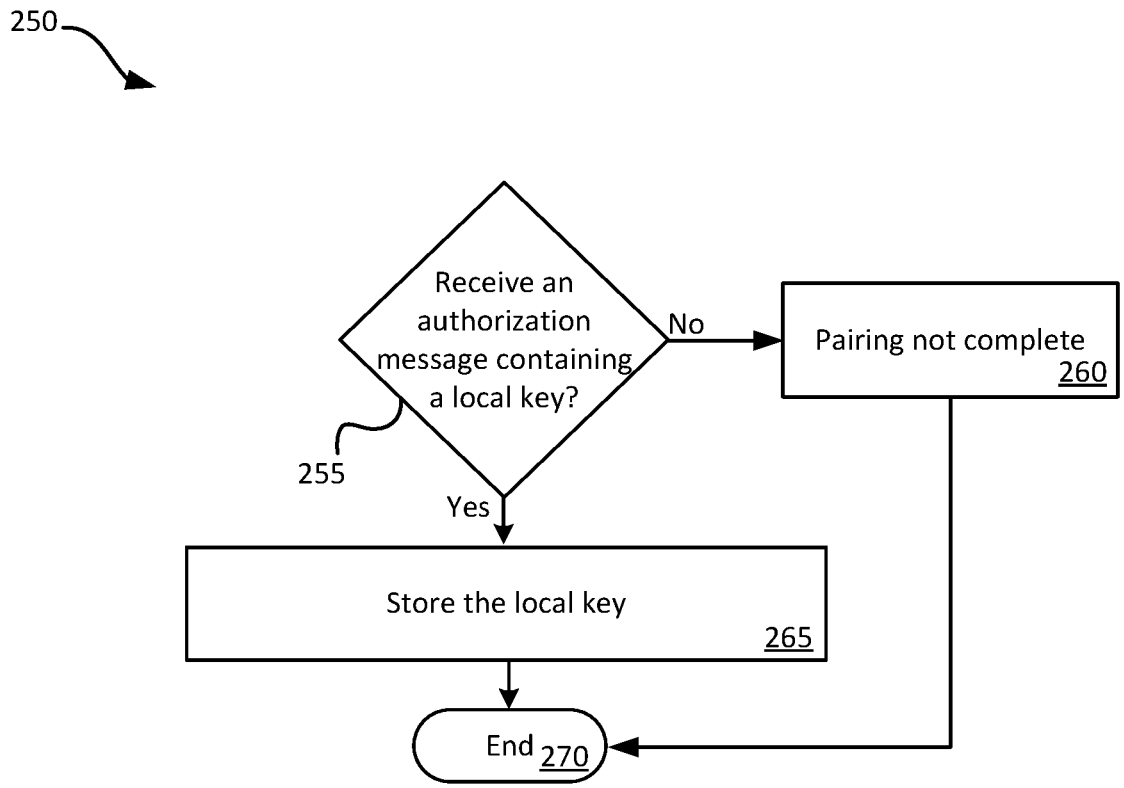

FIG. 2B illustrates a method 250 for pairing a smart card to a client television receiver. Method 250 can be performed by a smart card, such as smart card 130 of FIG. 1. The smart card can optionally use method 255 to pair with a host television receiver as well. Further, the smart card can optionally use method 255 to pair with multiple client television receivers. Each television receiver, including both host and client, can have a unique public name. The unique public name can be the unique identifier of the SOC within the television receiver as discussed above with respect to FIG. 1. This pairing method 250 can be initiated by, for example, a user interface on a display device connected to a host television receiver to which the smart card is coupled. For example, the television subscriber can utilize a user interface to request pairing. As another option, the method 250 can be initiated by, for example, a user interface on a display device connected to the client television receiver. For example, the television subscriber can utilize a user interface to request pairing. As another option, upon boot-up of the client television receiver, the method 250 can automatically begin with the client television receiver transmitting (e.g., broadcasting) its unique public name, which can be received by the smart card. As another option, the pairing operation can be automatically attempted if the smart card receives a transmission intended for the client television receiver but is not paired with the client television receiver. For example, at 220 of FIG. 2A. As another option, upon purchase of a client television receiver, a call center representative can add the client television receiver to the customer's account, which can trigger an authorization message to be sent to the customer's smart card.

Optionally, the smart card can request an authorization message from the television service provider for the client television receiver. The television service provider can know that the television subscriber has (or does not have) authorization to pair the client television receiver to the smart card. The television service provider can use the smart card to control access by the television subscriber to content and access on multiple televisions through multiple client television receivers. The request can include the unique public name (e.g., unique identifier of SOC 165) of the client television receiver as well as the unique identifier of the smart card as discussed above with respect to smart card 130 of FIG. 1.

At 255, the smart card can determine whether it received an authorization message from the television service provider with a proper authentication code and/or a local key specific to the client television receiver (e.g., the hardware local key of SOC 165 as discussed above with respect to FIG. 1). Optionally, if the television service provider deems that the client television receiver is not authorized, the television service provider may not send an authorization message. The smart card can, for example, timeout the request after a threshold period of time with no response from the television service provider. In such case, the pairing can be deemed incomplete at 260 and the method 250 can end at 270.

Optionally, the television service provider can transmit an authorization message to the smart card that may not contain the proper authorization code. For example, the authorization code may not be appropriate for that smart card because the client television receiver may not be authorized to pair with that smart card. In such case that the smart card does not receive a proper authorization code, the smart card can deem the pairing incomplete at 260 and the method can end at 270.

If the smart card received an authorization message with a proper authorization code and/or a local key unique to the client television receiver, at 265 the smart card can store the unique local key specific to the client television receiver. The smart card and the client television receiver are considered paired or married if the smart card has a unique local key specific to the client television receiver stored in memory. At 270, method 250 can end.

Optionally, this method 250 can be performed in conjunction with method 200, either prior to method 200 or at 220. Optionally, if there is current content or data to be transmitted to the client television receiver, the smart card can encrypt the data with the local key specific to the client television receiver and transmit the data to the client television receiver once the pairing is complete.

Figure 3:
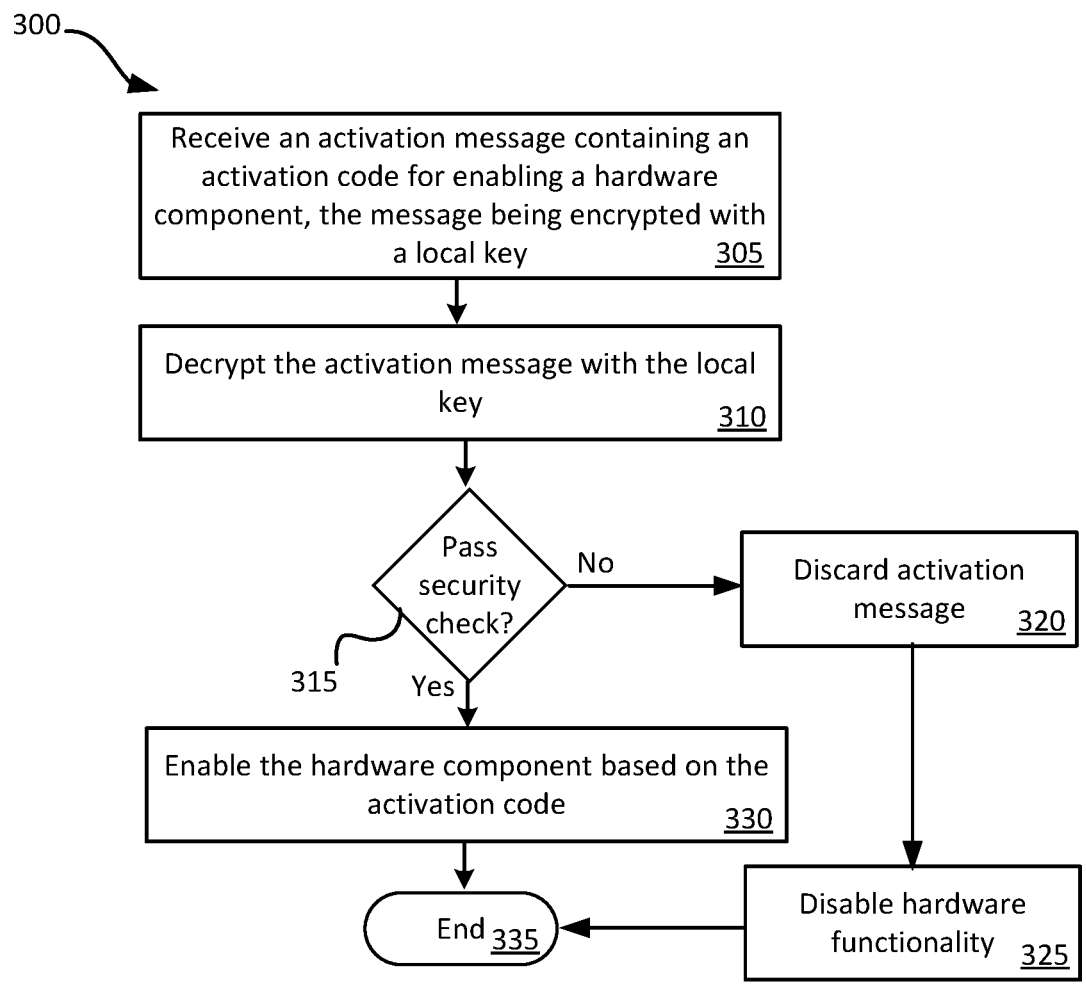
FIG. 3 illustrates another method for providing hardware enforcement of hardware components within a client television receiver.

FIG. 3 illustrates a method 300 for providing secured hardware enforcement of hardware functionality on a client television receiver. Method 300 can be performed by a client television receiver (e.g., client television receiver 160 of FIG. 1). More specifically, method 300 can be performed by a security processor on a client television receiver, such as security processor 175 of FIG. 1. Method 300 can begin where method 200 left off with the smart card transmitting an encrypted authorization message to the client television receiver.

Method 300 can begin at 305 with the security processor in the client television receiver receiving an activation message containing an activation code for enabling a hardware component within the client television receiver. The activation message can be encrypted with a local key, such as the local key discussed at 235 and 240 of FIG. 2A.

At 310 the security processor can use the local key specific to the client television receiver to decrypt the activation message. The local key can be a hardware local key that is programmed at manufacturing for the SOC on which the security processor resides. Because this local key is static and specific to the client television receiver, the SOC on the client television receiver can maintain the local key for decryption. Only trusted sources, such as the smart card paired with the client television receiver, can obtain the local key for encryption. The local key can be kept secure in trusted hardware on both the smart card and the television receiver as well as by the television service provider.

At 312, the security processor can optionally perform a security check and determine whether the security check passed. The security processor can optionally, as part of the security check, perform a signature check. The signature check can include the security processor checking, with a local signature key, whether the activation message was transmitted from a trusted source. Only trusted sources have the private local signature key needed to sign messages that can be signature checked with the public signature key. The security processor can confirm the source of the activation message is trusted if the signature check with the public signature key was successful. If the signature check passed, the security processor can optionally continue the security check with an integrity check discussed below. If the signature check failed, the security processor can discard the activation message at 320. Upon failure, the security processor can optionally discard the activation message at 320 and optionally disable all hardware functionality at 325 including that the security processor can return to a dormant state. Disabling the hardware functionality can ensure that signal and functionality thieves are thwarted because without any functionality the client television receiver is not very useful. If the hardware is disabled at 325, the method can end at 335. Note that the order of the integrity check and the signature check can be inverted. Stated differently, the integrity check can be optionally performed before the signature check. Further note that the signature check and the integrity check can each be optional. Optionally, only a signature check is performed. Optionally, only an integrity check is performed. Optionally, some other form of security check can be performed. Optionally, no security check is performed.

Optionally, as part of the security check, the security processor can perform an integrity check by calculating a hash of the activation message using a cryptographic hashing algorithm. The cryptographic hashing algorithm can be any suitable hashing algorithm used for confirming that the activation message has not been corrupted or tampered with.

The integrity check can be, for example, a check of the hash against a known value, for example against a hash that is passed with the activation message to the security processor. For example, the first bits transmitted to the security processor from the smart card can be a value against which the hash can be compared. As another example, the last bits transmitted to the security processor from the smart card can be a value against which the hash can be compared. The bits transmitted for comparison can be the value of the hash calculated by the television provider and/or the smart card and transmitted for the integrity check. The value can be calculated by the television service provider and/or the smart card using the same cryptographic hashing algorithm as used by the security processor. If the comparison passes, the integrity check can pass. If the integrity check fails, the activation message can optionally be discarded at 320 and the security processor can optionally disable all hardware functionality including that the security processor can return to a dormant state at 325. The method 300 can end at 335. Note that the decryption at 310, any signature check at 315, and/or any integrity check at 315 can be performed in any order. For example, the integrity check can be performed first, the signature check can be performed second, and the decryption can be performed last.

If the security processor determines that the security check passed, the security processor can enable the hardware component based on the activation code at 330. As part of the activation, there can be an activation code for the security processor itself, which may have been dormant until receiving the activation message. If the activation message includes an activation code for the security processor, then the security processor can proceed with activating hardware functionality based on other activation codes in the activation message. If the activation message does not include an activation code for the security processor, optionally, the security processor can return to a dormant state and disable the hardware functionality of the client television receiver. Disabling the security processor and the hardware functionality can make the client television receiver generally useless to a signal or functionality thief. If the proper activation code for the security processor is included or the security processor is not otherwise dormant, the security processor can determine which hardware components to enable based on the activation codes included in the activation message. For example, the client television receiver can include hardware functionality including a wireless network transceiver, a Bluetooth® transceiver, a DVR, a component for local content decryption, a component for high definition functionality, an external USB, an external hard drive, and an internal hard drive. Each of these components can have a unique activation code.

The activation code can be stored within memory in a trusted hardware area of the client television receiver. Upon receipt of the activation codes within the activation message, the security processor can compare the activation codes to those stored within memory to determine which hardware functionality to enable. Once the hardware functionality is enabled at 330, the method can end at 335.

The activation code can be included in the activation message that originated from the television service provider because the activation code can also be stored within an activation code database at the television service provider system (i.e., activation code database 147 of FIG. 1). When the television service provider system generates the activation message to send to the client television receiver, the television service provider can include the activation code for each hardware component that the television service subscriber has paid for/subscribed to. When the security processor on the client television receiver receives the activation message and identifies the activation codes within the activation message, the security processor can use the activation codes to enable the associated hardware components and disable all other hardware components within the client television receiver. So, for example, if the activation message includes an activation code for the wireless network transceiver and the DVR, the security processor can enable the wireless network transceiver and the DVR and disable the Bluetooth® transceiver, the component for high definition functionality, the external USB, and the external hard drive. The local content decryption can, for example, only be disabled when all hardware functionality is disabled because an invalid message is received as discussed at 340 and can be enabled by default. Further, the internal hard drive can be automatically enabled if, for example, DVR capability is enabled so that the DVR has a location for storing recorded content.

Note that while an activation message intended for a client television receiver is discussed in methods 200, 250, and 300, the activation message can also be intended for the host television receiver. The smart card, in such case, can pair with the host television receiver and determine the destination of the activation message is the host television receiver. The security processor on the host television receiver can receive the activation message and enable hardware on the host television receiver similar to the description above for a client television receiver.

FIG. 4 illustrates an embodiment of a satellite television distribution system 400. While a home automation system may be incorporated with various types of television receivers, various embodiments may be part of a satellite-based television distribution system. Cable, IP-based, wireless, and broadcast focused systems are also possible. Satellite television distribution system 400 may include: television service provider system 410, satellite transmitter equipment 420, satellites 430, satellite dish 440, television receiver 450, home automation service server 412, and display device 460. The display device 460 can be controlled by, for example, a user using a remote control device that can send wired or wireless signals to communicate with the television receiver 450 and/or display device 460. Alternate embodiments of satellite television distribution system 400 may include fewer or greater numbers of components. While only one satellite dish 440, television receiver 450, and display device 460 (collectively referred to as "user equipment") are illustrated, it should be understood that multiple (e.g., tens, thousands, millions of) instances and types of user equipment may receive data and television signals from television service provider system 410 via satellites 430.

Television service provider system 410 and satellite transmitter equipment 420 may be operated by a television service provider. A television service provider may distribute television channels, on-demand programming, programming information, and/or other content/services to users. Television service provider may also distribute software updates for television receiver 450. Television service provider system 410 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 420 may be used to transmit a feed of one or more television channels from television service provider system 410 to one or more satellites 430. While a single television service provider system 410 and satellite transmitter equipment 420 are illustrated as part of satellite television distribution system 400, it should be understood that multiple instances of transmitter equipment may be used, possibly scattered geographically, to communicate with satellites 430. Such multiple instances of satellite transmitting equipment may communicate with the same or with different satellites. Different television channels may be transmitted to satellites 430 from different instances of transmitting equipment. For instance, a different satellite dish of satellite transmitter equipment 420 may be used for communication with satellites in different orbital slots.

Satellites 430 may be configured to receive signals, such as streams of television channels or other data including software images for updating various television receivers, from one or more satellite uplinks such as satellite transmitter equipment 420. Satellites 430 may relay received signals from satellite transmitter equipment 420 (and/or other satellite transmitter equipment) to multiple instances of user equipment via transponder streams. Different frequencies may be used for uplink signals 470 from downlink signals 480. Satellites 430 may be in geosynchronous orbit. Each of the transponder streams transmitted by satellites 430 may contain multiple television channels transmitted as packetized data. For example, a single transponder stream may be a serial digital packet stream containing multiple television channels. Therefore, packets for multiple television channels may be interspersed. Further, information used by television receiver 450 for home automation functions may also be relayed to a television receiver via one or more transponder streams. Further still, software images used to update television receiver 450 can be relayed to television receiver 450 via one or more transponder streams.

Multiple satellites 430 may be used to relay television channels or any other data such as information used for home automation or software images used to update television receiver 450 from television service provider system 410 to satellite dish 440. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 430*a*. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 440 may be a piece of user equipment that is used to receive transponder streams from one or more satellites, such as satellites 430. Satellite dish 440 may be provided to a subscriber for use on a subscription basis to receive television channels provided by the television service provider system 410, satellite transmitter equipment 420, and/or satellites 430. Satellite dish 440, which may include one or more low noise blocks ("LNBs"), may be configured to receive transponder streams from multiple satellites and/or multiple transponders of the same satellite. Satellite dish 440 may be configured to receive television channels via transponder streams on multiple frequencies. Based on the characteristics of television receiver 450 and/or satellite dish 440, it may only be possible to capture transponder streams from a limited number of transponders concurrently. For example, a tuner of television receiver 450 may only be able to tune to a single transponder stream from a transponder of a single satellite at a given time. The tuner can then be re-tuned to another transponder of the same or a different satellite. A television receiver 450 having multiple tuners may allow for multiple transponder streams to be received at the same time.

In communication with satellite dish 440 may be one or more television receivers. Television receivers may be configured to decode signals received from satellites 430 via satellite dish 440 for output and presentation via a display device, such as display device 460. A television receiver may be incorporated as part of a television or may be part of a separate device, commonly referred to as a set-top box ("STB"). Television receiver 450 may decode signals received via satellite dish 440 and provide an output to display device 460. On-demand content, such as pay-per-view ("PPV") content, may be stored to a computer-readable storage medium. FIG. 1 provides additional detail of various embodiments of a television receiver. A television receiver is defined to include STBs, and also circuitry having similar functionality that may be incorporated with another device. For instance, circuitry similar to that of a television receiver may be incorporated as part of a television. As such, while FIG. 4 illustrates an embodiment of television receiver 450 as separate from display device 460, it should be understood that, in other embodiments, similar functions may be performed by a television receiver integrated with display device 460. Television receiver 450 may include home automation engine 411.

Display device 460 may be used to present video and/or audio decoded and output by television receiver 450. Television receiver 450 may also output a display of one or more interfaces to display device 460, such as an electronic programming guide ("EPG"). In many embodiments, display device 460 is a television. Display device 460 may also be a monitor, computer, or some other device configured to display video and, possibly, play audio.

Uplink signal 470*a* represents a signal between satellite transmitter equipment 420 and satellite 430*a*. Uplink signal 470*b* represents a signal between satellite transmitter equipment 420 and satellite 430*b*. Each of uplink signals 470 may contain streams of one or more different television channels. For example, uplink signal 470*a* may contain a first group of television channels, while uplink signal 470*b* contains a second group of television channels. Each of these television channels may be scrambled such that unauthorized persons are prevented from accessing the television channels. Uplink signals 470 can also contain other data as described herein, such as software images for updating television receiver 450.

Downlink signal 480*a* represents a signal between satellite 430*a* and satellite dish 440. Downlink signal 480*b* represents a signal between satellite 430*b* and satellite dish 440. Each of downlink signals 480 may contain one or more different television channels, which may be at least partially scrambled. A downlink signal may be in the form of a transponder stream. A single transponder stream may be tuned to at a given time by a tuner of a television receiver. For example, downlink signal 480*a* may be a first transponder stream containing a first group of television channels, while downlink signal 480*b* may be a second transponder stream containing a different group of television channels. In addition to or instead of containing television channels, a transponder stream can be used to transmit on-demand content to television receivers, including PPV content, which may be stored locally by the television receiver until output for presentation. Further, a transponder stream can contain other data as described herein, such as software images for updating television receiver 450.

FIG. 4 illustrates downlink signal 480*a* and downlink signal 480*b*, being received by satellite dish 440 and distributed to television receiver 450. For a first group of television channels, satellite dish 440 may receive downlink signal 480*a* and for a second group of channels, downlink signal 480*b* may be received. Television receiver 450 may decode the received transponder streams. As such, depending on which television channels are desired to be presented or stored, various transponder streams from various satellites may be received, descrambled, and decoded by television receiver 450. Further, television receiver 450 can control content as described in more detail in FIG. 1.

Network 490, which may include the Internet, may allow for bidirectional communication between television receiver 450 and television service provider system 410, such as for home automation related services provided by home automation service server 412. Although illustrated as part of the television service provider system, the home automation service server 412 may be provided by a third party in embodiments. In addition or in alternate to network 490, a telephone, e.g., landline, or cellular connection may be used to enable communication between television receiver 450 and television service provider system 410.

Figure 5:
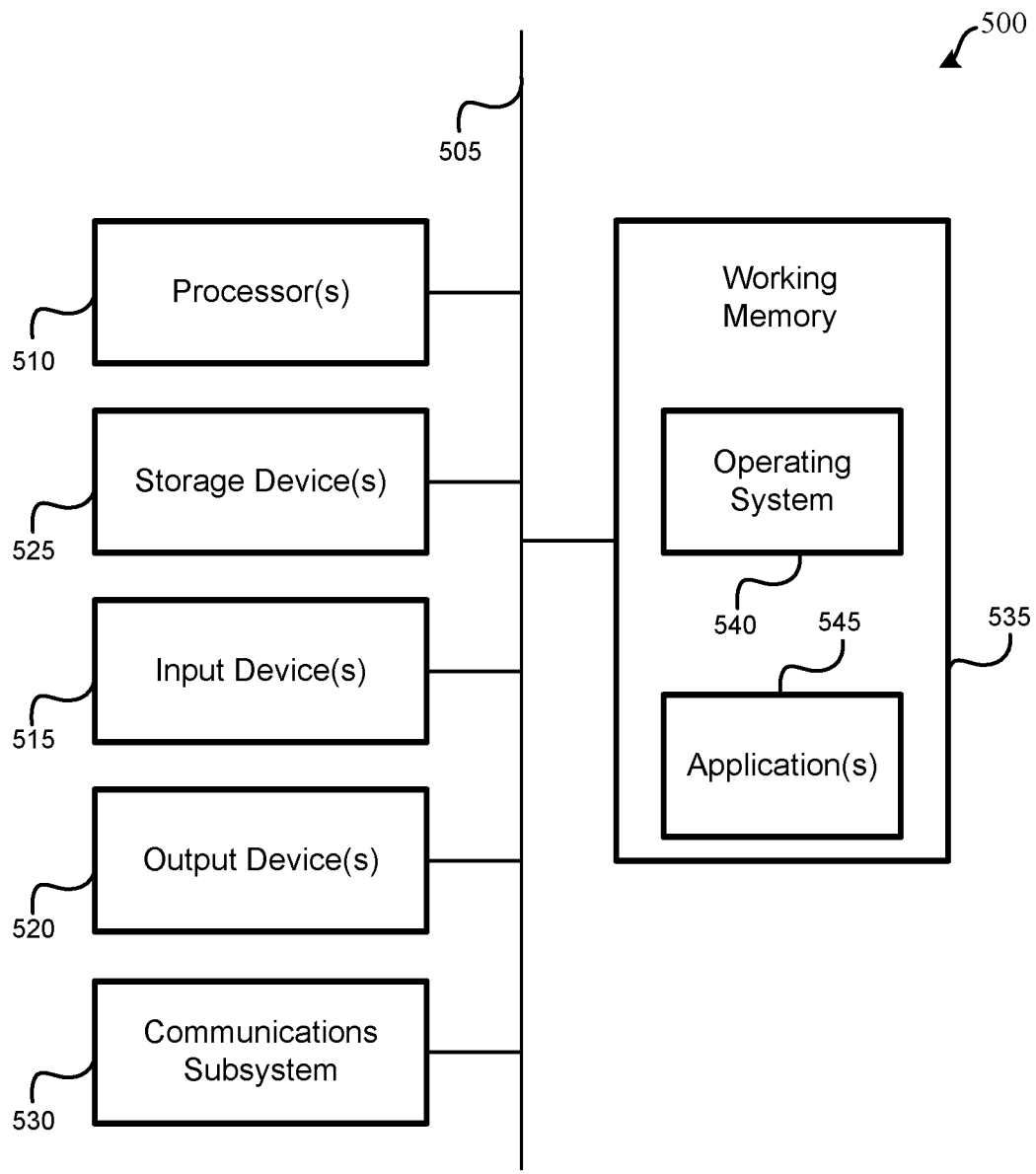
FIG. 5 illustrates an embodiment of a computer system.

FIG. 5 illustrates an embodiment of a computer system 500. A computer system 500 as illustrated in FIG. 5 may be incorporated into devices such as a television receiver (e.g., host television receiver 105 of FIG. 1), DVR, television, media system, personal computer, and the like. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510 (e.g., processor 152 and processor 194 of FIG. 1), including without limitation one or more general-purpose processors and/or one or more special-purpose processors such as digital signal processing chips, graphics acceleration processors, and/or the like; one or more input devices 515, which can include without limitation a mouse, a keyboard, a camera, a remote control, and/or the like; and one or more output devices 520, which can include without limitation a display device, a printer, and/or the like.

The computer system 500 may further include and/or be in communication with one or more non-transitory storage devices 525 (e.g., memory 107 and/or memory 162 of FIG. 1), which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, may be incorporated into the computer system 500 (e.g., an electronic device or STB), as an input device 515. In many embodiments, the computer system 500 will further comprise a working memory 535, which can include a RAM or ROM device, as described above. Memory 162 and memory 107 of FIG. 1 can include a working memory.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 2A, 2B, or 3, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method, comprising
receiving, at a smart card in a host television receiver, an activation message containing an encrypted activation code;
decrypting, by the smart card, the activation message including the activation code in accordance with a global network key stored by the smart card;
determining, by the smart card, in accordance with the activation message, that the activation code is destined for a client television receiver that is communicatively coupled with the host television receiver and having a security processor, and that the activation code is for enabling a hardware component of the client television receiver;
encrypting, by the smart card, the activation message including the activation code with a local key unique to the client television receiver, instances of the local key stored by both the smart card and the client television receiver;

transmitting, by the smart card, the activation message encrypted with the local key to the security processor of the client television receiver;

receiving, by the security processor, the activation message encrypted with the local key;

decrypting, by the security processor, the activation message including the activation code with the local key; and enabling, by the security processor, the hardware component of the client television receiver based on the activation code.

2. The method of claim 1, further comprising:
receiving, at the smart card, a second activation message;
decrypting, by the smart card, the second activation message;
security checking, by the smart card, the second activation message; and
discarding, by the smart card, the second activation message if the security check of the second activation message failed.

3. The method of claim 2, wherein the security checking comprises:
performing, by the smart card, an integrity check comprising:
calculating, by the smart card, a hash of the second activation message using a cryptographic hashing algorithm; and
determining, by the smart card, whether the second activation message was tampered with based on the hash; and
determining, by the smart card, that the security check passed only if the smart card determined that the second activation message was not tampered with.

4. The method of claim 2, wherein the security checking comprises:
performing, by the smart card, a signature check comprising determining whether the second activation message was transmitted from a television service provider based on a signature key; and
determining, by the smart card, that the security check passed only if the smart card determined that the second activation message was transmitted from the television service provider.

5. The method of claim 1, wherein the hardware component is a first hardware component of a plurality of hardware components of the client television receiver, the method further comprising:
receiving, by the security processor, a second activation message;
decrypting, by the security processor, the second activation message;
security checking, by the security processor, the second activation message; and
disabling, by the security processor, each of the plurality of hardware components if the security check of the second activation message failed.

6. The method of claim 5, wherein the security checking comprises:
performing, by the security processor, an integrity check comprising:
calculating, by the security processor a hash of the second activation message using a cryptographic hashing algorithm; and
determining, by the security processor, whether the second activation message was tampered with based on the hash; and
determining, by the security processor, that the security check passed only if the security processor determined that the second activation message was not tampered with.

7. The method of claim 1, wherein the hardware component is selected from the group consisting of a wireless network transceiver, a Bluetooth® transceiver, a digital video recorder, a hard drive, and a universal serial bus connector.

8. The method of claim 1, wherein the client television receiver comprises a second hardware component having a second activation code, the method further comprising:
determining, by the security processor, that the activation message does not contain the second activation code; and
disabling, by the security processor, the second hardware component.

9. The method of claim 1, further comprising:
pairing, by the smart card, with the security processor by:
receiving, by the smart card, an authorization message containing the local key unique to the client television receiver from a television service provider; and
storing, by the smart card, the local key in a memory.

10. The method of claim 9, wherein the client television receiver is a first client television receiver of a plurality of client television receivers, and wherein the smart card is configured to pair with a limited number of the plurality of client television receivers.

11. A system, comprising:
a host television receiver, comprising an interface for communication with a smart card;
the smart card communicatively coupled with the host television receiver, and comprising:
a smart card processor; and
a smart card memory having stored thereon instructions which, when executed by the smart card processor, cause the smart card processor to:
receive an activation message containing an encrypted activation code;
decrypt the activation message including the activation code in accordance with a global network key stored by the smart card;
determine in accordance with the activation message, that the activation code is destined for a client television receiver that is communicatively coupled with the host television receiver and having a security processor, and that the activation code is for enabling a hardware component of the client television receiver;
encrypt the activation message including the activation code with a local key unique to the client television receiver, instances of the local key stored by both the smart card and the client television receiver; and
transmit the activation message encrypted with the local key to the client television receiver; and
the client television receiver, comprising:
the hardware component;
a security processor; and
a security memory having stored thereon instructions which, when executed by the security processor, cause the security processor to:
receive the activation message encrypted with the local key from the smart card;

decrypt the activation message including the activation code with the local key; and enable the hardware component based on the activation code.

12. The system of claim 11, wherein the smart card memory has stored thereon further instructions which, when executed by the smart card processor, cause the smart card processor to:

receive a second activation message;
decrypt the second activation message;
security check the second activation message; and
discard the second activation message if the security check of the second activation message failed.

13. The system of claim 12, wherein the instructions in the smart card memory for security checking the second activation message include instructions which, when executed by the smart card processor, cause the smart card processor to:

perform an integrity check comprising:
calculating a hash of the second activation message using a cryptographic hashing algorithm, and
determining whether the second activation message was tampered with based on the hash; and
determine that the security check passed only if the second activation message was not tampered with.

14. The system of claim 12, wherein the instructions in the smart card memory for security checking the second activation message include instructions which, when executed by the smart card processor, cause the smart card processor to:

perform a signature check comprising determining whether the second activation message was transmitted from a television service provider based on a signature key; and
determine that the security check passed only if the smart card processor determined that the second activation message was transmitted from the television service provider.

15. The system of claim 11, wherein the hardware component is a first hardware component of a plurality of hardware components of the client television receiver, and wherein the security memory has stored thereon further instructions which, when executed by the security processor, cause the security processor to:

receive a second activation message;
decrypt the second activation message;
security check the second activation message; and
disable each of the plurality of hardware components if the security check of the second activation message failed.

16. The system of claim 15, wherein the instructions in the security memory for security checking the second activation message include instructions which, when executed by the security processor, cause the security processor to:

perform an integrity check comprising:
calculating a hash of the second activation message using a cryptographic hashing algorithm, and
determining whether the second activation message was tampered with based on the hash; and
determine that the security check passed only if the security processor determined that the second activation message was not tampered with.

17. The system of claim 11, wherein the hardware component is selected from the group consisting of a wireless network transceiver, a Bluetooth® transceiver, a digital video recorder, a hard drive, and a universal serial bus connector.

18. The system of claim 11, wherein the client television receiver further comprises a second hardware component, the second hardware component having a second activation code, and wherein the security memory has stored thereon further instructions which, when executed by the security processor, cause the security processor to:

determine that the activation message does not contain the second activation code; and
disable the second hardware component.

19. The system of claim 11, wherein the smart card memory has stored thereon further instructions which, when executed by the smart card processor, cause the smart card processor to:

pair with the client television receiver by:
receiving an authorization message containing the local key unique to the client television receiver; and
storing the local key in the smart card memory.

20. The system of claim 19, wherein the client television receiver is a first client television receiver of a plurality of client television receivers, and wherein the smart card is configured to pair with a limited number of the plurality of client television receivers.

* * * * *